(12) United States Patent
Kamal et al.

(10) Patent No.: US 9,031,541 B2
(45) Date of Patent: May 12, 2015

(54) METHOD FOR TRANSMITTING INFORMATION STORED IN A TAMPER-RESISTANT MODULE

(75) Inventors: Mohammad Ashfaq Kamal, King of Prussia, PA (US); Ioannis Tsampalis, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 347 days.

(21) Appl. No.: 13/442,536

(22) Filed: Apr. 9, 2012

(65) Prior Publication Data

US 2013/0267199 A1    Oct. 10, 2013

(51) Int. Cl.
| | |
|---|---|
| *H04L 12/66* | (2006.01) |
| *H04L 29/06* | (2006.01) |
| *H04W 12/04* | (2009.01) |
| *H04W 12/06* | (2009.01) |

(52) U.S. Cl.
CPC ......... *H04L 63/0853* (2013.01); *H04L 63/0892* (2013.01); *H04W 12/04* (2013.01); *H04W 12/06* (2013.01)

(58) Field of Classification Search
USPC ....................................................... 455/558
See application file for complete search history.

(56) References Cited

U.S. PATENT DOCUMENTS

| | | |
|---|---|---|
| 7,418,596 B1 | 8/2008 | Carroll et al. |
| 2004/0230489 A1* | 11/2004 | Goldthwaite et al. .......... 705/26 |

OTHER PUBLICATIONS

"Security and Trust Services API (SATSA)" for Java™ 2 Platform, Micro Edition, Version 1.0, Java Community Process (JCP), 2004.

* cited by examiner

*Primary Examiner* — Charles Appiah
*Assistant Examiner* — Randy Peaches

(57) ABSTRACT

A system and method are described in which direct communication between a removable tamper-resistant module in a mobile terminal and a third party server is permitted only after security information is transmitted indirectly through a secure server in a mobile network operator that provides mobile communication services to the mobile terminal. The third party server is logically located outside of the mobile network operator. The secure server is configured to be able to communicate with the removable tamper-resistant module via the secure communication link. The information is transmitted from the removable tamper-resistant module to the third party server or from the third party server to the removable tamper-resistant module and includes a key for encryption or decryption or a certificate for verifying data or program transmissions therebetween.

20 Claims, 9 Drawing Sheets

| Entry | Key | Entity | IP Address | Application |
|---|---|---|---|---|
| 1 | xxxx | ABC Corp | 10.123.456.xx | Text |
| 2 | yyyy | ABC Corp | 10.123.457.xx | Email |
| 3 | zzzz | XYZ Corp | 12.987.456.xx | Text |

METHOD FOR TRANSMITTING INFORMATION STORED IN A TAMPER-RESISTANT MODULE

BACKGROUND

A subscriber identity module (SIM) or a universal integrated circuit card (UICC) (herein after collectively referred to as a "SIM card") is one type of a tamper-resistant authentication device (tamper-resistant module) for a mobile terminal such as a cellular phone, a personal digital assistant (PDA) or a mobile computer. The SIM card includes an integrated circuit (IC) that securely stores the International Mobile Subscriber Identity (IMSI) and a related key used to identify and authenticate the subscriber on the mobile network. A SIM card contains, for example, its unique serial number (integrated circuit card identifier "ICCID"), IMSI and network authentication keys.

The ICCID is a unique serial number for the SIM that is used to visually identify each SIM. The ICCID includes a number up to 19 digits long including an issuer identification number, individual account identification and a check digit. The IMSI enables an operator of mobile communication service (e.g., a wireless service carrier) to uniquely identify the subscriber on their network. The IMSI is tied to the corresponding telephone number so that a network of the mobile communication operator can connect phone calls with the mobile device that contains the SIM card by using the IMSI.

The authentication key Ki is a 128-bit value used in authenticating the SIM on the wireless network. Each SIM holds a unique Ki assigned to it by the mobile communication operator during the personalization process. The Ki is also stored in a database (known as Authentication Center) on the mobile communication operator's network.

The SIM card can also store, for example, a user's private key, a public key, certificate or personal information. The information stored in the SIM card is tamper-resistant and secure. Accordingly, information stored in the SIM card may by utilized for security, authentication or encryption purposes. For example, the SIM information can be used for personal identification or for mobile payment.

However, the SIM card is accessible only by a trusted server of the operator of mobile communication service because of security reasons, and a server of a third party that is located outside of the mobile network operator cannot directly communicate with the SIM card. Accordingly, there are more potential uses of the security features of the SIM cards by the third party under control of the mobile network operator.

BRIEF DESCRIPTION OF DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

At a high-level, the technologies in this example of a SIM security service enable a SIM card of a mobile terminal to generate a key (such as a private key and/or a public key) or certificate for encryption/decryption, and to send the generated key/certificate to a server that can securely communicate with the SIM card. The server then forwards the key/certificate to equipment of a third party entity that subscribes to the SIM security service. The entity can utilize the key/certificate to establish a secure communication between the entity and the mobile terminal. In other embodiments, the key/certificate is provided from the third party entity equipment through the server to the SIM card.

Figure 1A:
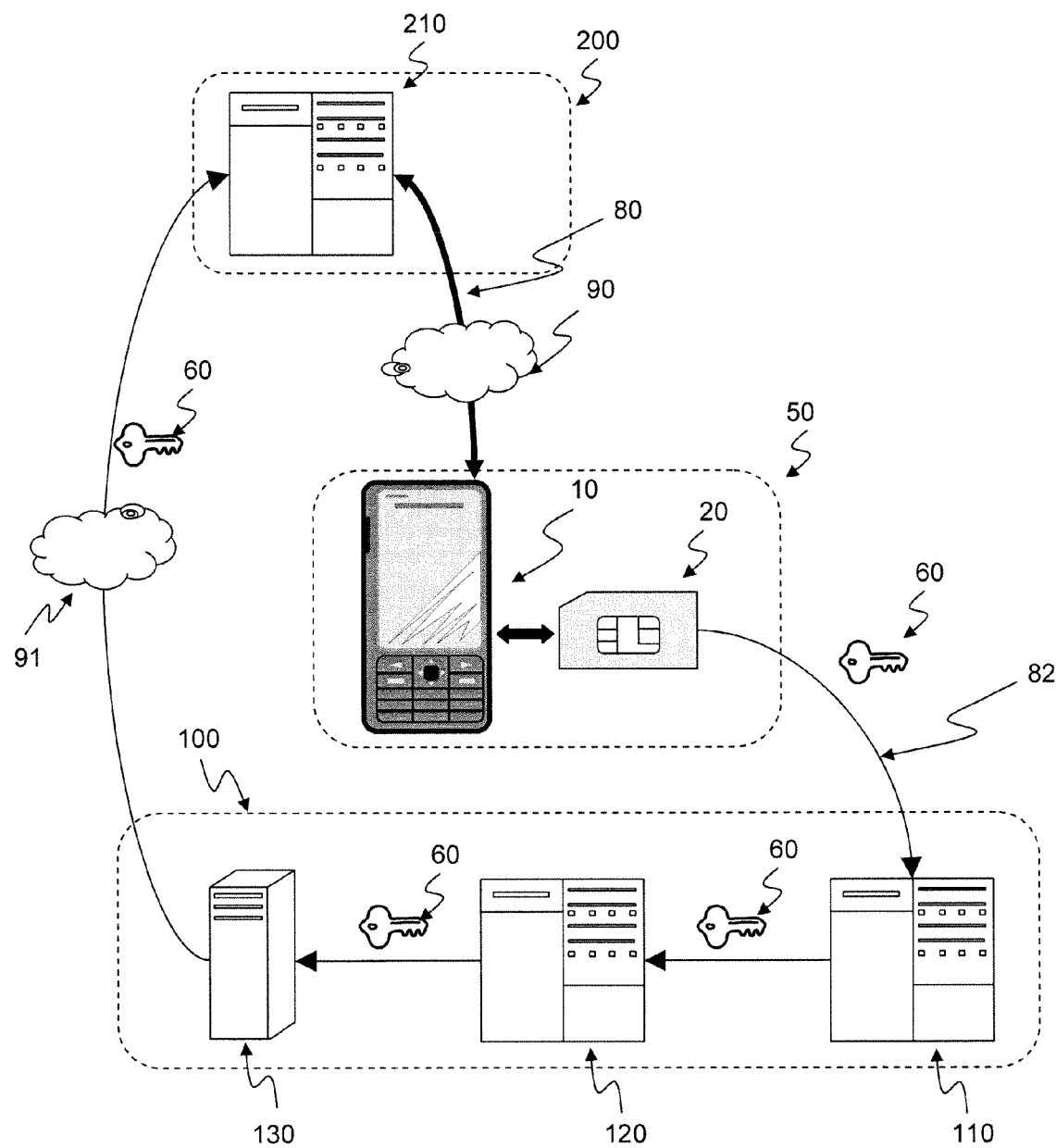
FIG. 1A illustrates an example of a SIM security service according to the first example of the present disclosure.
Figure 1B:
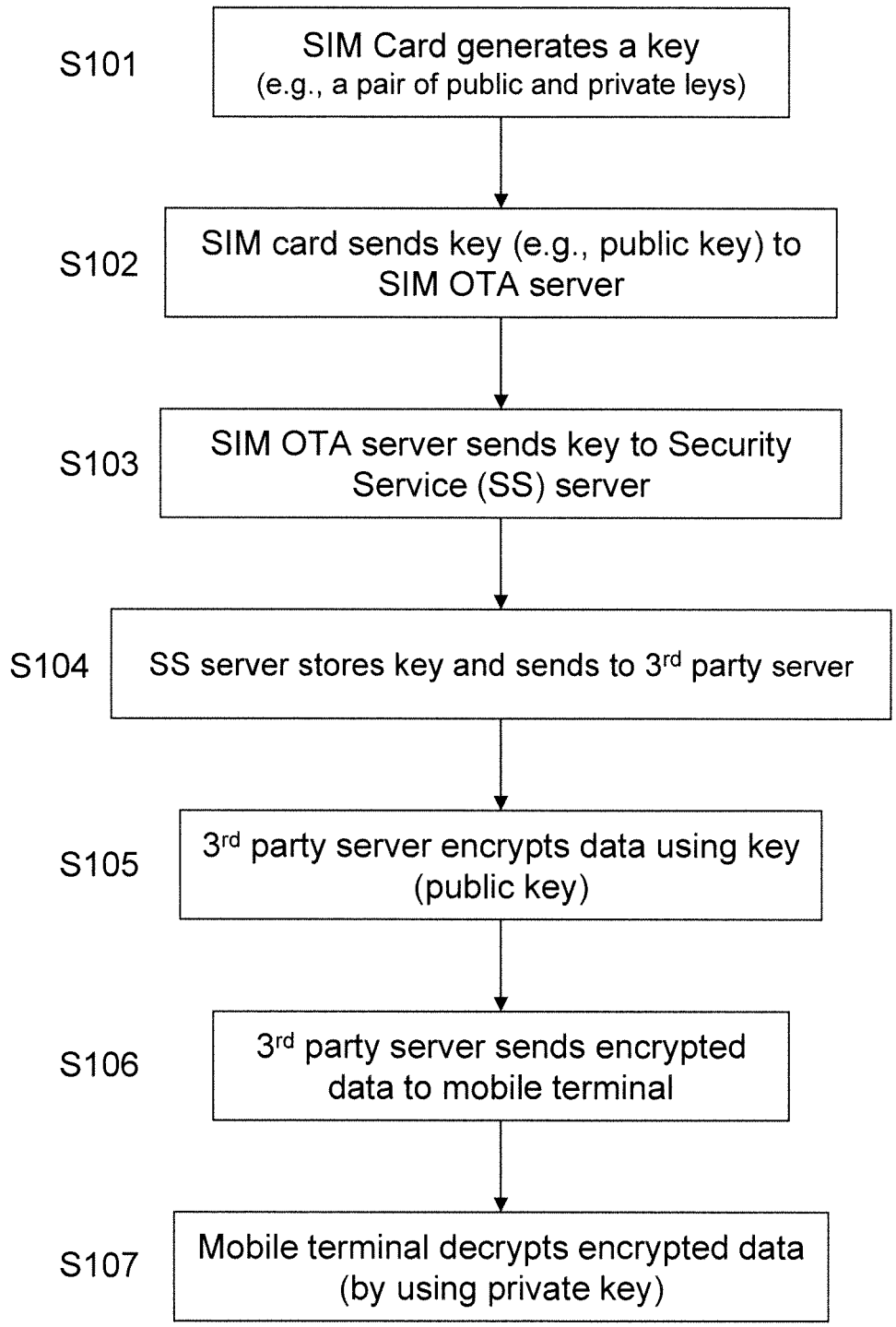
FIG. 1B shows a flowchart of the security service of the first example.

FIG. 1A shows an overall diagram illustrating the SIM security service of this first example. FIG. 1B shows an exemplary flow chart of the security service. In FIG. 1A, a mobile network operator (MNO) 100 provides mobile communication services to a mobile terminal 10 which includes a SIM card 20. Equipment of the MNO including, for example, servers 110, 120 and a firewall 130, is located behind the facility or network of the MNO 100. A third party entity 200 has entered a contract with the MNO 100 to subscribe the SIM security service provided by the MNO 100 to establish a secure communication link 80 with the mobile terminal 10 of its employee 50 via a network 90 such as the Internet. The entity 200 can communicate with the equipment of the MNO 100 using its server 210 via a network 91 such as the Internet.

Figures 3, 4:
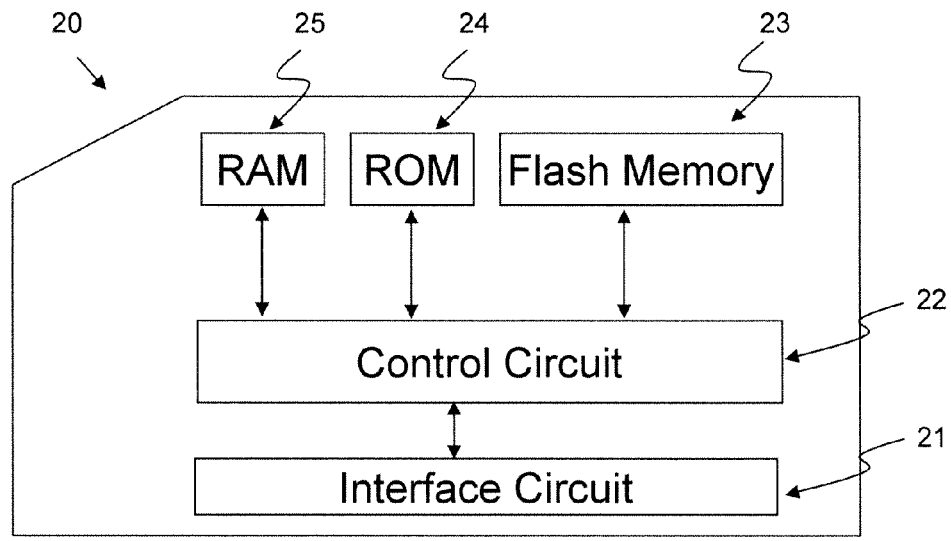
FIG. 3 shows an exemplary block diagram of a SIM card.
FIG. 4 shows an exemplary list of data stored in the SIM card.

FIG. 3 shows a block diagram of an exemplary SIM card 20. The SIM card 20 may include an interface circuit 21 for communication with a mobile terminal in which the SIM card 20 is installed, a control circuit 22, a flash memory 23, a ROM 24 and a RAM 25. The flash memory 23, for example, may provide tamper resistant memory spaces, which can prevent unauthorized access to that memory space of the SIM card. For example, a SIM card provides separate memory spaces for each application executable on the mobile terminal such that the memory space for one application is isolated and cannot be accessed by another application. This is achieved through security domains that are defined by the specification for SIM cards. Each access to different stored content is protected by a different key. A program stored in the ROM 24, when executed by the control circuit 22, may cause the SIM card to execute various functions, including functions related to the SIM security service.

An enterprise entity 200 that, for example, wishes to establish secure communication with its employees' mobile terminals 10, may utilize this service. The entity 200 is a third party customer of a mobile network operator 100 that provides mobile communication services to the mobile terminals 10. The secure communication may include email, short messaging service (SMS) messages, or text messages, etc. The entity's server 210 is logically located outside of the mobile network operator's internal network but is coupled to the servers 110, 120 of the mobile network operator 100 through a network 91, for example, the Internet.

The entity 200 that wishes to utilize the SIM security service may first provide its employees 50 with an application program (that uses the SIM) for secure communication. An example of the application program includes a secure communication program such as a secure text message program that utilizes, for example, encryption of data being communicated. The employees 50 may download the secure text message program to their mobile terminals 10 from a website of the entity 200 provided by the server 210 or the website designated by the entity 200. In the alternative, the entity 200 may provide the employees 50 with mobile terminals 10 in which the secure text message program has been pre-installed.

The entity 200 may also provide its public key to the mobile terminals 10 of the employees 50 so that the mobile terminals 10 are able to encrypt data and send the encrypted data to the entity's server 210. Such a public key may be provided with the secure communication program or, if not delivered at the same time as the secure communication program, separately via a network 90 between the server 210 and the mobile terminals 10.

Any of the employees 50 can execute the program, e.g., the secure text message program in this example, on their mobile terminal 10. The executed secure text message program causes a SIM card 20 installed in a mobile terminal 10 to generate a key 60 based on information stored in the SIM card 20 (S101). For example, an authentication key Ki stored in the secure flash memory 23 of the SIM card 20 can be utilized to generate the key 60. The generated key 60 may be a public key for the SIM card 20 and/or for the mobile terminal 10. At the same time a private key may be generated by and stored in the mobile terminal 10.

When the key 60 is generated, the SIM card 20 may store the key 60 in a secure memory space of the flash memory 23 of the SIM card 20 by associating the key 60 with the secure text message program. For example, the key 60 may be stored in the memory 23 as an entry of a table in which the key 60 and the corresponding program identification (e.g., the name of the program) with which the key 60 is to be utilized are associated. When another secure communication program is further installed and executed, the SIM card 20 may create an additional secure memory space in the flash memory 23 for the additional program and store a new key created for the additional program in association with the additional program.

Then, the SIM card 20 may transmit the key 60 to a server 110 of the MNO 100 by utilizing a wireless interface of the mobile terminal 10 (S102). The server 110 of the MNO 100 may be a SIM Over-the-Air (OTA) server that can securely communicate with the SIM card 20.

A SIM OTA server (or platform) is used to update a file system or applications of the SIM card. The SIM OTA server is not typically used for normal wireless communication. While the authentication center authenticates a user to the mobile network, the SIM OTA server does not authenticate a user to the mobile network. The SIM OTA server becomes able to communicate with the SIM card after the user (subscriber) is authenticated to the mobile network.

It is noted that general servers (for example, servers of the entity 200) cannot directly communicate with the SIM card 20, and therefore cannot receive the key 60 directly from the SIM card 20. In contrast, the SIM OTA server 110 of the MNO 100 can communicate with the SIM card, and the communication of the SIM card 20 and the SIM OTA server 110 is secure. When transmitting the key 60 to the SIM OTA server 110, the SIM card 20 may include information about the secure communication program such as the name or identification of the secure communication program. The communication link 82 between the SIM OTA server 110 and the SIM card 20 is securely established and the payloads are encrypted, e.g., based on a PSK-TLS (Pre-Shared Key Ciphersuites for Transport Layer Security) handshake process and the HTTPS protocol or on the GSM 03.48 standard.

Upon receipt of the key 60 from the SIM card 20, the SIM OTA server 110 may transmit the key 60 to a security service server 120 of the MNO 100. The security service server 120, in turn, provides the security service (S103). The security service server 120 may include an identification server or a trusted security management server. In this example, the security service server 120 is separately provided from the SIM OTA server 110. In other examples, while the security service server 120 may be implemented within the SIM OTA server 110, it may be preferable, however, to provide the security service server 120 separately from the SIM OTA server 110 to avoid any third party from directly communicating with the SIM OTA server 110. Since the SIM OTA server 110 may contain important information (e.g., root keys) of the SIM card 20, no third party should be able to directly interface with the SIM OTA server 110. It is noted that the SIM OTA server 110 may pass through the key 60 to the security service server 120 and may not store the key 60 within the SIM OTA server 110 (except as needed to transmit the key 60 to the appropriate target, which is not herein considered storing the key 60).

Upon receipt of the key 60 from the SIM OTA server 110, the security service server 120 may store the key 60 in its storage (e.g., a hard disk drive or optical disk) in association with the identity information of the SIM card 20 (e.g., ICCID, IMSI or mobile phone number assigned to the SIM card 20).

The security service server 120 may acquire the identity information of the SIM card 20 from the SIM OTA server 110 (S104). For example, when communicating with the SIM card 20, the SIM OTA server 110 acquires the identity information of the SIM card 20, and the SIM OTA server 110 may send the identification information to the security service server 120 together with the key 60. In the alternative, the SIM OTS server 110 may include a database listing the identification information of plurality of SIM cards.

Further, as set forth above, the SIM card 20 may have transmitted the information about the secure communication program when sending the key 60 to the SIM OTA server 110. The information about the secure communication program may include a name of the program or identity information (e.g., a code) of the program. If the information about the secure communication program has also been transmitted from the SIM card 20, the security service server 120 may receive the information from the SIM OTA server 110 and may store the key 60 in association with the information about the secure communication program so that the secure server 120 knows that the key 60 is generated and used to the particular secure communication program. The secure server 120 may further sign the received key 60 authenticating that the key is genuine or issue a certificate for the received key 60 certifying that the key 60 is authenticated by the MNO 100.

Then, the secure server 120 may transmit the key 60 (or key 60 with the signature or the certificate) to a server 210 of the entity 200 via, for example, a firewall 130 (i.e., the server 210 is located outside of the firewall 130 of the MNO 100) (S104). The communication between the security service server 120 and the server 210 is preferably a secure communication (e.g., the key 60 being encrypted), but is not necessary when the key 60 is a public key. When multiple mobile terminals 10 of the employees 50 send the keys 60 to the MNO 110, the secure server 120 may create and transmit a list of keys 60 sent from the employees' mobile terminals 10 to the server 210. The list may include the keys 60 in association with the mobile phone numbers of the employees' mobile terminals 10 or other identification information that identifies each of the mobile terminals 10 (and/or employees 50).

When the entity 200 receives the key 60, the server 210 may utilize the key 60 for secure communication with the employees' mobile terminal 10. For example, the server 210 encrypts text data by using the key 60 (S105) and sends the encrypted text data to the mobile terminal 10 via the interne (S106). In this case, the key 60 is a public key of the SIM card 20 or the mobile terminal 10. Accordingly, the server 210 can send the encrypted data to the mobile terminal 10 of the employee 50, thereby establishing the secure communication 80.

The mobile terminal 10 in turn receives the encrypted data by the secure text message program. When the mobile terminal 10 receives the encrypted data, the secure text message program may decrypt the encrypted data by using a key (in this case, a private key) stored in the SIM card 20 (S107). In this case, the SIM card 20 generates the public key and transmits it to the server 210 via the MNO servers, while the SIM card 20 generates the private key and stores it in the secure memory space of the SIM card 20.

In turn, the secure text message program on the mobile terminal 10 may encrypt data by using a public key that has been provided by the server 210, for example, with the secure text message program. Accordingly, the entity server 210 can securely communicate the employees' mobile terminals 10, thereby establishing the secure communication link 80.

In the first example (FIGS. 1A and 1B), the SIM card 20 in the mobile terminal 10 generates the key 60 (public key) and provides the key 60 to the server 210 of the entity 200 via the system in the MNO 100. In contrast, at a high-level, the second example of a SIM security service enables a SIM card 20 of a mobile terminal 10 to receive and store a key 65 such as a public key provided by the server 210 of a third party entity 200. The key 65 is transmitted from the SIM OTA server 110 to the SIM card 20, and the SIM card 20 receives and stores the key 65 in its secure memory area. The mobile terminal 10 then encrypts data by using the key 65 and sends the encrypted data to the server 210 of the entity 200.

Figure 2A:
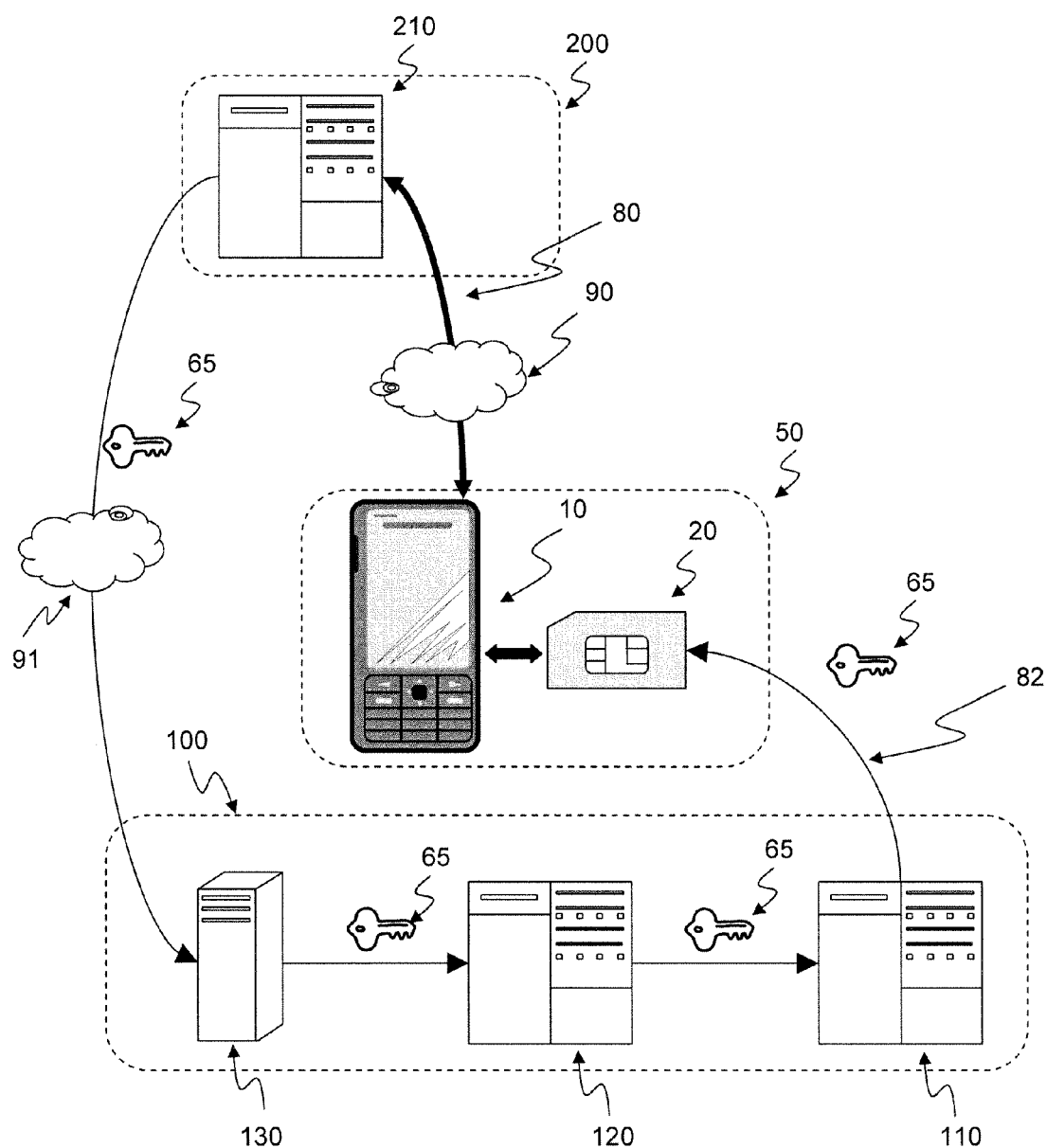
FIG. 2A illustrates an example of a SIM security service according to the second example of the present disclosure.
Figure 2B:
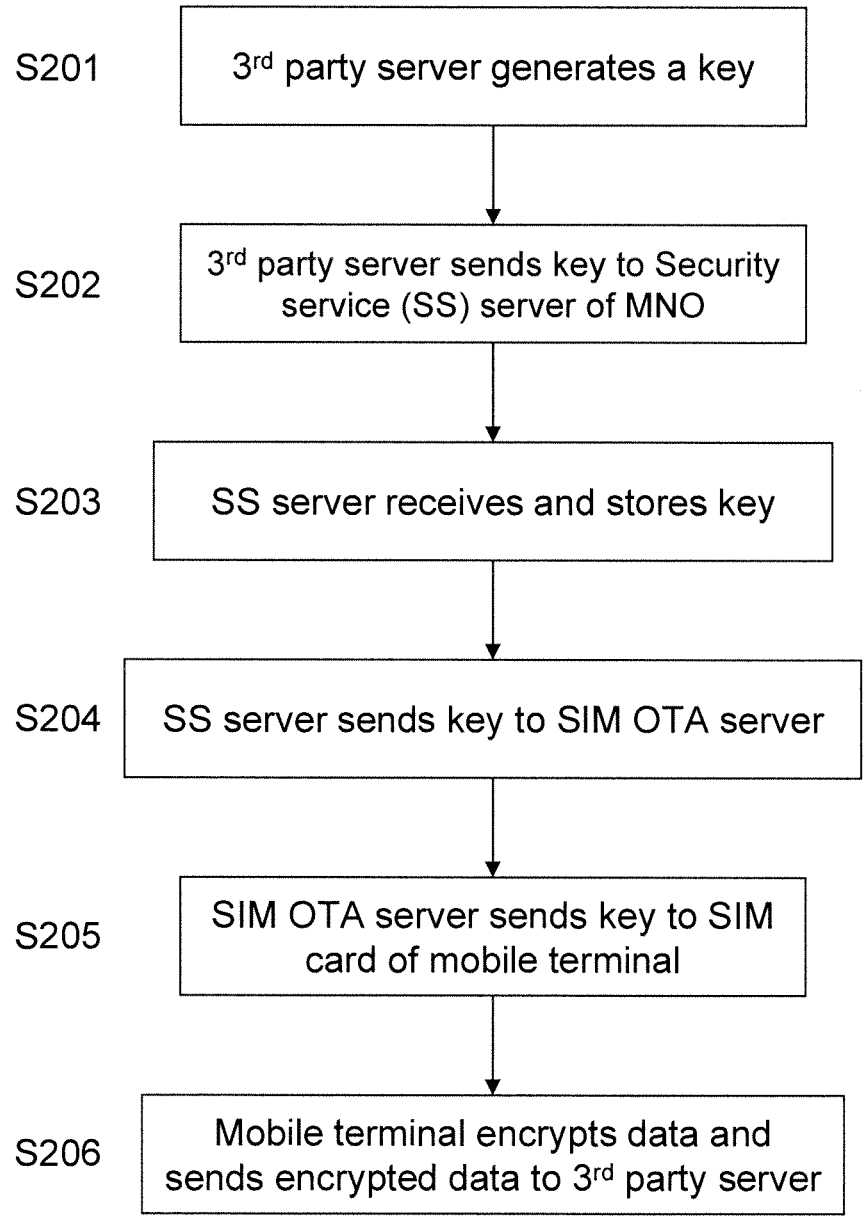
FIG. 2B shows a flowchart of the security service of the second example.

FIG. 2A shows an overall diagram illustrating the SIM security service of the second example. Some specifics described in relation to FIG. 1A, although present in FIGS. 2A, 5A and 6A, may be omitted from the following descriptions for simplicity. FIG. 2B shows an exemplary flow chart of the security service. Similar to FIG. 1A, in FIG. 2A, a mobile network operator (MNO) 100 provides mobile communication services to a mobile terminal 10, which includes a SIM card 20. Equipment of the MNO 100 includes, for example, servers 110, 120 and a firewall 130, is located inside the facility or network of the MNO 100. A third party enterprise entity 200 has entered a contract with the MNO 100 to subscribe the SIM security service provided by the MNO 100 to establish a secure communication 80 with the mobile terminal 10 of its employee 50 via a network 90 such as the Internet. The entity 200 communicates with the equipment of the MNO 100 using its server 210 via a network 91 such as the Internet.

An enterprise entity 200 that, for example, wishes to establish secure communication with its employees' mobile terminals 10, may utilize this service. The entity 200 is a third party customer of a mobile network operator that provides mobile communication services to the mobile terminals 10. The secure communication may include email, short messaging service (SMS) messages, or text messages, etc. The entity's server 210 is located outside of the mobile network operator's internal network but is coupled to the servers 110, 120 of the mobile network operator 100 through a network 91, for example, the Internet.

The entity 200 that wishes to utilize the SIM security service may generate a public key 65 of the entity 200 (or a public key used by the server 210) (S201) and send the public key 65 to the MNO 100 via a network 91 or by a storage medium, such as an optical or magnetic disk or flash memory (S202). Along with the public key 65, the entity 200 may provide information indicating that the public key 65 is used for communication with the equipment (e.g., server 210) of the entity 200 or with other servers designated by the entity 200. The MNO 100 receives the public key 65 of the entity 200 from the secure server 120 (S203). In addition, or in the alternative, the entity 200 may provide the MNO 100 with a list including employees' identification (e.g., employees' mobile terminals phone numbers) together with the public key 65 to the MNO 100 so that the public key 65 is distributed by the equipment of the MNO 100 to the employees' mobile terminals 10.

The secure server 120 may send the public key 65 of the entity 200 to the SIM OTA server 110 (S204). Then, the SIM OTA server 110 may send the public key 65 to the SIM card 20 of the mobile terminal 10 of the employee 50 (or the listed mobile terminals of employees) via the secure network 82 (S205). When sending the public key 65 of the entity 200, the SIM OTA server 110 may also send information that the public key 65 belongs to the entity 200 or is utilized for communications with the server 210 of the entity or the server designated by the entity 200. An IP address of the server 210 (or the server designated by the entity 200) may be used in the association.

The SIM card 20 of the mobile terminal 10 receives and stores the public key 65 of the entity 200 in its secure memory area of the flash memory 23. The SIM card 20 may store the public key 65 in association with the entity 200, the server 210 or the server designated by the entity 200, so that the SIM card can identify that the public key 65 is designated for the communication with the entity 200.

The mobile terminal 10 may utilize the public key 65 to encrypt data, e.g., text data, when the mobile terminal 10 communicates with the entity 200, the server 210 or the server designated by the entity 200 (S206). Accordingly, the third party entity 200 can establish a secure communication link 80 with the employees' mobile terminals 10.

The flash memory 23 of the SIM card 20 may have multiple secure memory areas for storing multiple keys. The entity 200 may wish to utilize multiple public keys or multiple third party entities may wish to utilize the SIM security service with respect to the same mobile terminal 10. In such a case, different entities (or the same entity) may independently utilize the secure memory areas in the flash memory 23 of the SIM card 20.

As set forth above, the SIM card 20 may store the public key in association with the entity 200, for example, with identification information such as an IP address of the server 210. Similarly, when the SIM card 20 receives a new additional public key belonging to a new entity, the SIM card 20 stores the new public key in association with the new entity. In this way, the flash memory 23 may have a list of the public keys in its secure memory area as shown in FIG. 4.

In FIG. 4, for example, a first public key "xxxx" (e.g., key 65) which has been provided by ABC Corp (e.g., entity 200) is stored in the first entry (i.e., the first secure memory area) in association with the name of ABC Corp and designated IP address of the server (e.g., server 210). Further, the entry may include a type of communication program with which the key is used. Similarly, the third entry may include a key "zzzz" for XYZ Corp in association with an IP address designated by the XYZ Corp and the type of the communication program.

When multiple public keys are stored in the SIM card 20, a communication program (e.g., a text messaging program or an email program) may select a proper public key according to the destination of the communication (e.g., the IP address). If the communication program is provided by the entity 200, the program may select the proper public key from the SIM card 20 based on the designation in the program, if the program designates the public key therein.

In the above example, a key (e.g., a public key) for encryption is exchanged between the SIM card 20 and the third party 200 via the SIM OTA server 110. However, the information exchanged is not limited to keys for encryption/decryption. Similar technologies can be used to verify an application program downloaded to a mobile terminal. When a mobile terminal downloads an application program, for example, from a website of the program vendor, the mobile terminal should verify if the downloaded application program is a "genuine" program provided by the program vendor to avoid executing malware. For example, a code signing certificate is used to digitally verify the software. In the following example, more personalized certificates for verifying application programs will be provided.

At a high-level, the third example of a SIM security service enables a SIM card 20 of a mobile terminal 10 to receive and store a certificate 70 for verifying an application program that is being downloaded and installed to the mobile terminal 10. The certificate 70 is provided by, for example, an application software vendor (i.e., a third party 300) to the MNO 100. The certificate 70 is then transmitted from the SIM OTA server 110 of the MNO 100 to the SIM card 20, and the SIM card 20 receives and stores the certificate 70 in its secure memory area. When the mobile terminal 10 installs an application program from the application software vendor, the mobile terminal 10 may verify that the application program is an authenticated program of the particular vendor by utilizing the vendor's certificate 70 stored in the SIM card 20.

Figure 5A:
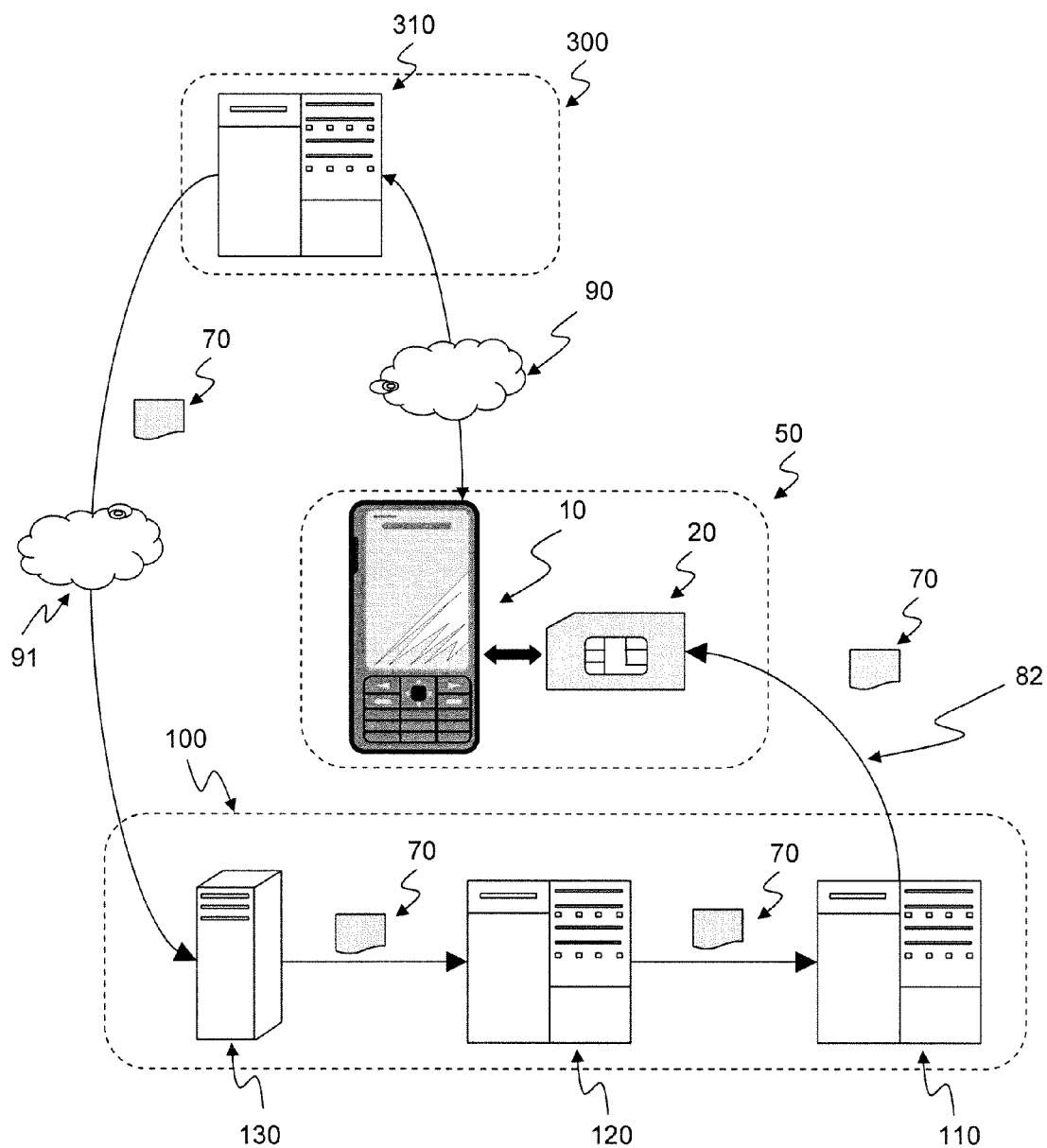
FIG. 5A illustrates an example of a SIM security service according to the third example of the present disclosure.
Figure 5B:
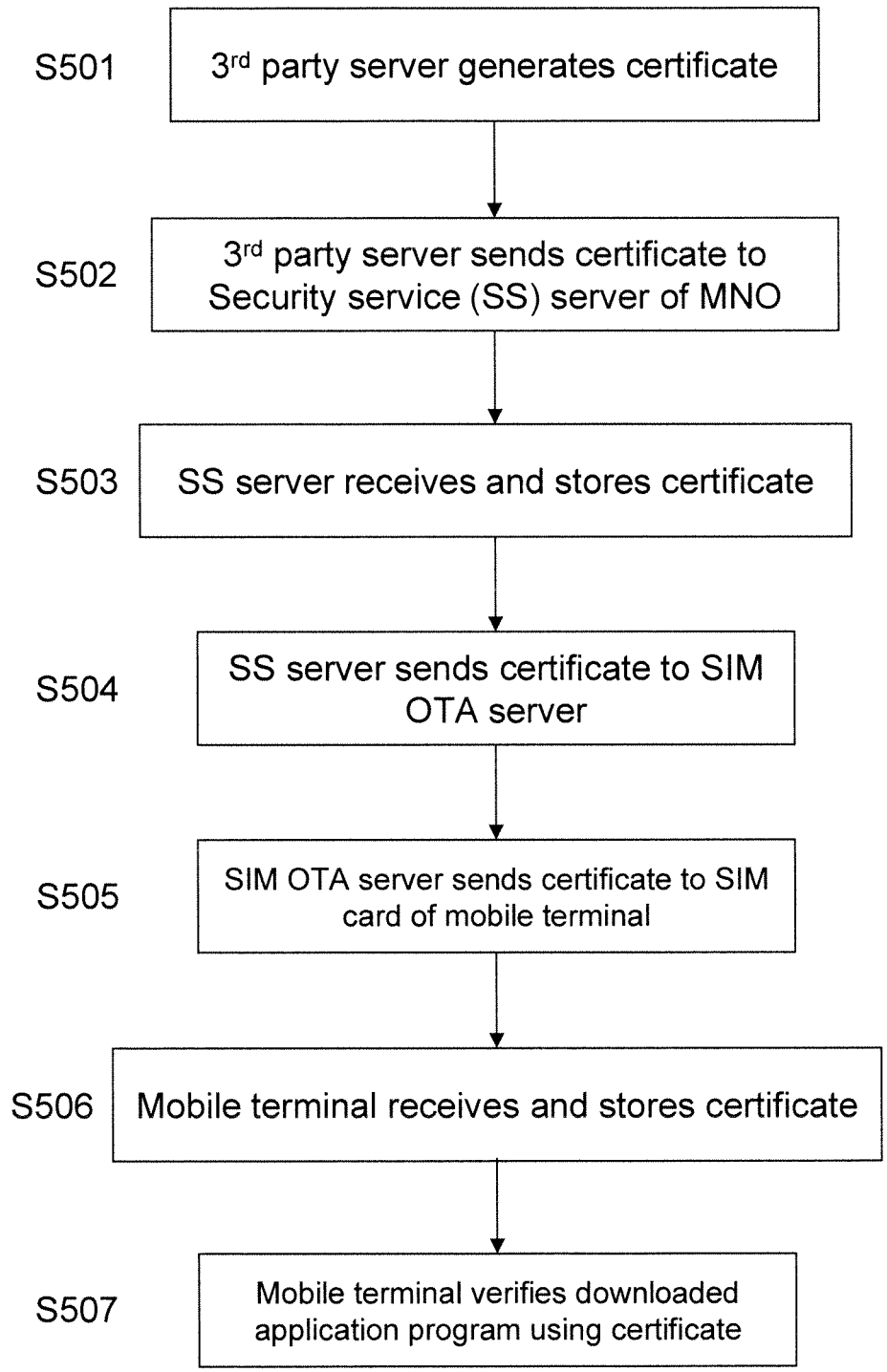
FIG. 5B shows a flowchart of the security service of the third example.

FIG. 5A shows an overall diagram illustrating the SIM security service of the third example. FIG. 5B shows an exemplary flow chart of the security service. In FIG. 5A, a MNO 100 provides mobile communication services to a mobile terminal 10 which includes a SIM card 20. Equipment of the MNO includes, for example, servers 110, 120 and a firewall 130, is located inside the facility or network of the MNO 100. A third party enterprise entity, for example, a software vendor 300 has entered a contract with the MNO 100 to subscribe the SIM security service provided by the MNO 100. The vendor 300 communicates with the equipment of the MNO 100 using its server 310 via a network 91 such as the Internet.

The software vendor 300 wishes to authenticate its application program that is going to be downloaded to a customer's mobile terminal 10. To achieve this, the vendor 300 may generate a certificate 70 of the vendor 300 (S501) by using known public key infrastructure (PKI) and the equipment 310 (e.g., a server) of the vendor 300 may provide the certificate 70 to the equipment of the MNO 100 via a network 91 (S502).

The certificate 70 is utilized by the mobile terminal 10 to verify that application program is a genuine program provided by the vendor 300. The MNO 100 receives the certificate 70 of the vendor 300 by the secure server 120 (S503). Instead of certificate 70, the vendor may generate a public key and send it to the MNO for use by the user of the mobile terminal 10.

The secure server 120 may send the certificate 70 of the vendor 300 to the SIM OTA server 110 of the MNO 100 (S504). Then, the SIM OTA server 110 may send the certificate 70 to the SIM card 20 of the mobile terminal 10 via the secure communication link (S505). When sending the certificate 70 of the vendor 300, the SIM OTA server 110 may also send information that the certificate belongs to the vendor 300.

The certificate 70 may be sent to the SIM card 20 by a request of the SIM card 20. For example, when the mobile terminal 10 downloads an application, the mobile terminal 10 may request a certificate for the particular program from the SIM OTA server 110. In return, the SIM OTA server 110 provides the SIM card 20 with the proper certificate 70. The SIM card 20 of the mobile terminal 10 receives and stores the certificate 70 of the vendor 200 in it secure memory area (S506).

On the other hand, the software vendor 300 may include information in its application programs. The information indicates that the application program is genuine. The information may be the same as the certificate 70 or the information with which the mobile terminal 10 can verify the application program by utilizing the certificate 70 stored in the SIM card 20 of the mobile terminal.

The mobile terminal 10 downloads an application program from the server 310 of the vendor 300 via a network 90, for example, the Internet. The mobile terminal 10 may verify that the downloaded program is a genuine application program provided by the vendor 300 by utilizing the information included in the downloaded program and the certificate 70 stored in the SIM card 20 (S507). For example, if the information in the program corresponds to the certificate 70, the mobile terminal 10 verifies that the program is genuine.

In the foregoing example, the certificate 70 is sent to the SIM card 20 by a request of the mobile terminal 10. In the alternative, the SIM OTA server 100 may provide the SIM card 20 with one or more certificates in advance.

For example, the vendor 300 may wish to provide its registered users (i.e., members) with the certificate 70. In such a case, the server 310 of the vendor 300 may provide the MNO 100 with a list of identification information of the members, together with the certificate 70 of the vendor 300. For example, the list may include the members' mobile phone numbers. Upon registration of new members for the vendor 300, the new members provide the vendor 300 with their mobile phone numbers. The vendor 300 creates a list and sends the list to the server 120 of the MNO 100, requesting that the certificate 70 of the vendor 300 be distributed to the mobile terminals of the members on the list. Of course, the vendor 300 may update the list when new members join and send the updated list to the server 120 of the MNO 100 requesting update of distribution of the certificate 70. In such a case, the certificate 70 may be updated.

When any of the members downloads an application program, the application program can be verified by the mobile phone 10 by utilizing the pre-stored certificate 70. Further, the vendor 300 may periodically renew the certificate 70. In such a case, the SIM OTA server 110 that receives the new certificate may replace the existing certificate in the SIM card 20 with the new certificate.

If the user 50 of the mobile phone 10 registers with (and thus becomes a member of) different software vendors that also subscribe this SIM security service, the SIM card 20 can store multiple certificates in a similar manner to the second example as shown in FIG. 4. Note that although the use of certificates is described herein as being applied to application programs, in other examples the information to be verified is not limited to application programs. For example, browsing a web site may be approved (verified) by using this information.

In the third example (FIGS. 5A and 5B), the third party server 310 generates the certificate and provides the certificate to the SIM card 20 of the mobile terminal 10 via the system in the MNO 100. In contrast, at a high-level, the fourth example of a SIM security service enables a SIM card 20 of a mobile terminal 10 to provide a user certificate 75 for a software vendor 300 to include in its application program that is to be installed in the mobile terminal 10. The user certificate 75 is generated by utilizing secure information in the SIM card 20 e.g., by using an on-board-key-generation technique where the SIM card 20 generates crypto keys using a crypto hardware module on the SIM card 20, and is transmitted to the SIM OTA server 110 of the MNO 100. The servers 110, 120 in the MNO 100 then forward the user certificate 75 to the software vendor 300 that subscribes the SIM security service. The software vendor 300 includes the user certificate 75 in its application program. When the application program is downloaded in the user's mobile terminal 10, the mobile terminal 10 can verify that the downloaded program is a genuine program by confirming the user certificate 75 included in the program.

Figure 6A:
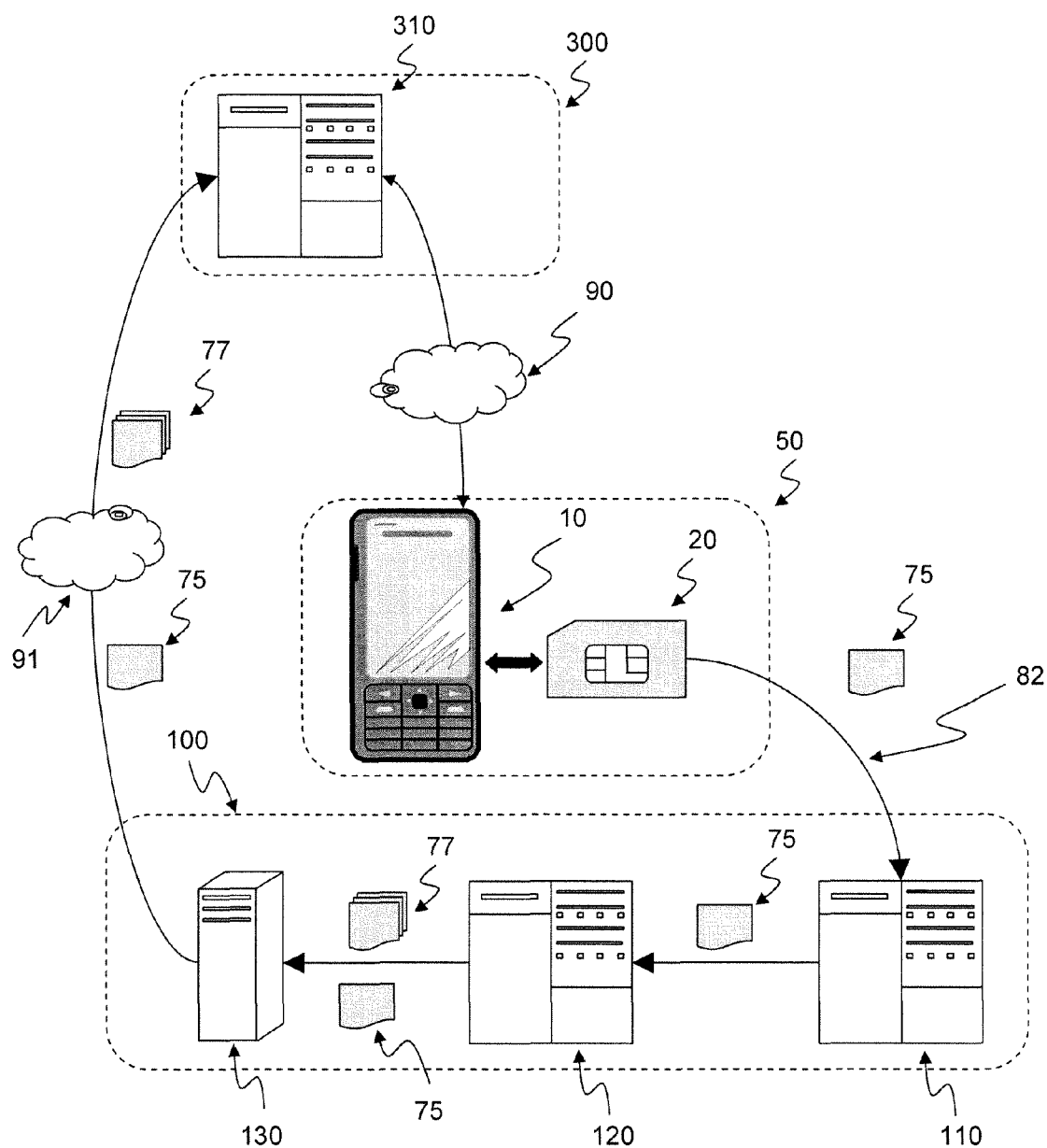
FIG. 6A illustrates an example of a SIM security service according to the fourth example of the present disclosure.
Figure 6B:
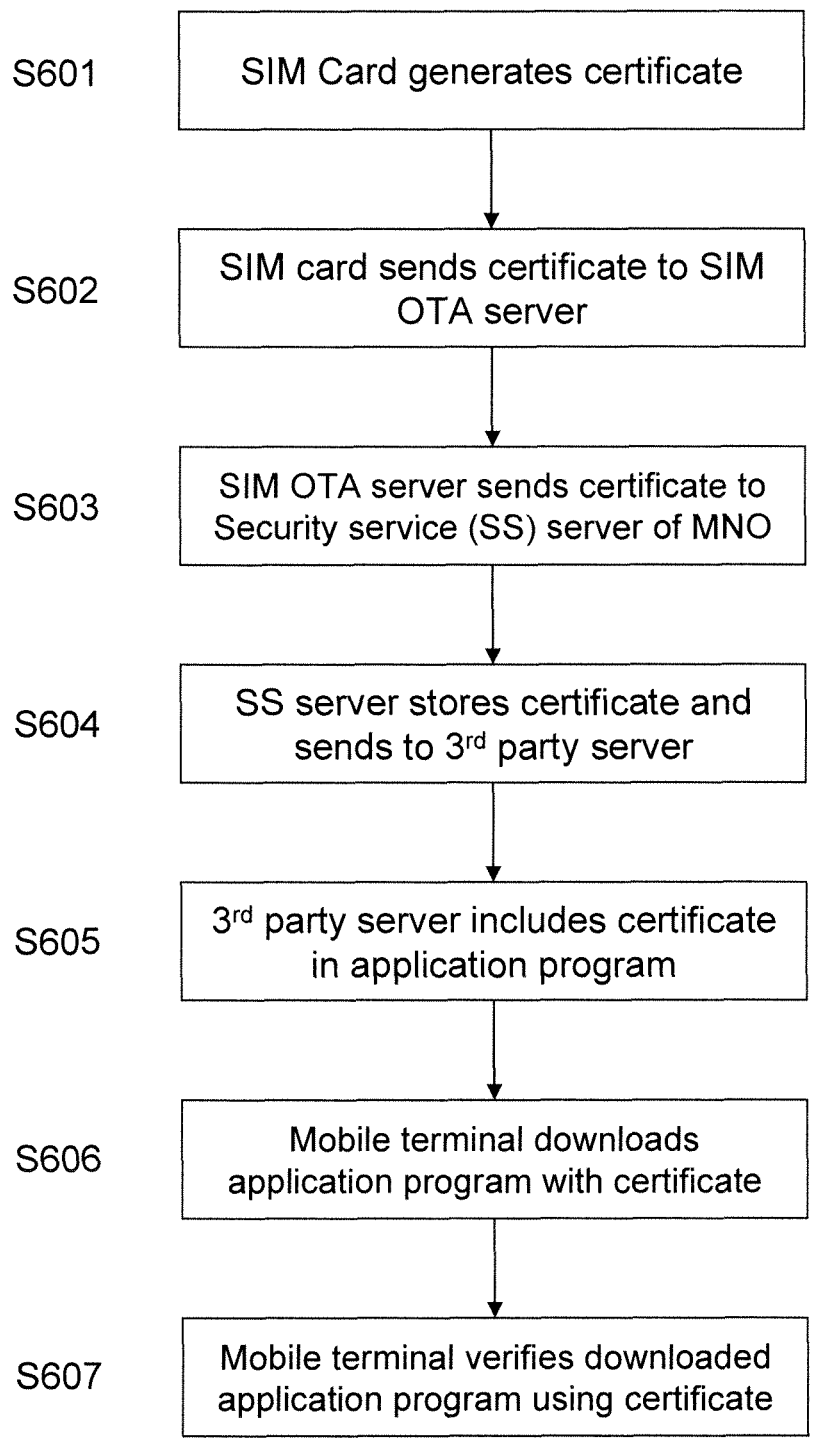
FIG. 6B shows a flowchart of the security service of the fourth example.

FIG. 6A shows an overall diagram illustrating the SIM security service of the fourth example. FIG. 6B shows an exemplary flow chart of the security service. In FIG. 6A, a MNO 100 provides mobile communication services to a mobile terminal 10 that includes a SIM card 20. Equipment of the MNO 100 includes, for example, servers 110, 120 and a firewall 130, located inside the facility or network of the MNO 100. A third party enterprise entity, for example, a software vendor 300 has entered a contract with the MNO 100 to subscribe the SIM security service provided by the MNO 100. The vendor 300 communicates with the equipment of the MNO 100 using its server 310 via a network 91 such as the Internet.

The SIM card 20 of a mobile terminal 10 of a user 50 may generate a user certificate 75 by utilizing secure information stored in the SIM card 20 (S601). For example, an authentication key Ki stored in the SIM card 20 can be utilized to generate the certificate 75.

Then, the SIM card 20 may transmit the certificate 75 to the SIM OTA server 110 of the MNO 100 by utilizing a wireless interface of the mobile terminal 10 via the secure communication link (S602). Upon receipt of the certificate 75 from the SIM card 20, the SIM OTA server 110 may transmit the certificate 75 to the security service server 120, which provides the security service (S603). The certificate 75 may be generated upon requested by the SIM OTA server 110. In such a case, the SIM OTA server 110 may collect multiple certificates and send them to the secure server 120.

Upon receipt of the certificate 75 from the SIM OTA server 110, the security service server 120 may store the certificate 75 in its storage (e.g., a hard disk drive or optical disk) in association with the identity information of the SIM card 20 (e.g., ICCID, IMSI or mobile phone number assigned to the SIM card), which the security service server 120 already knows or has acquired from the SIM OTA server 110. For example, when communicating with the SIM card 20, the SIM OTA server 110 knows the identity information of the SIM card 20, and the SIM OTA server 110 may send the identification information to the security service server 120 together with the certificate 75, and the server 120 stores the certificate 75 (S604). The security service server may store multiple certificates sent from multiple mobile terminals.

A software vendor 300 provides application programs to mobile terminals 10 of end users 50. When the user 50 of the mobile terminal 10 accesses the server 310 of the vendor 300 to download an application program via a network 90, for example, the Internet, the server 310 may require the mobile terminal 10 to send identification information of the mobile terminal 10, for example, the mobile phone number of the mobile terminal 10.

Then, the server 310 of the vendor 300 accesses the security service server 120 of the MNO 100 requesting the user certificate corresponding to the mobile phone number of the mobile terminal 10, and the server 120 of the MNO provides the server 310 with the corresponding certificate 75 (S604). Upon receiving the user certificate 75, the server 310 may include the user certificate 75 in the application program to be downloaded in the mobile terminal 10 (S605)

In the alternative, the vendor 300 may acquire the user certificate 75 from the MNO 100 in advance. For example, the secure server 120 of the MNO 100 may provide a list 77 of certificates to the vendor 300 (or from the vendor 300— similar to the process shown in FIG. 5A). The list 77 may include certificates of end users who have registered as members of the software vendor 300. Such members may utilize this service to verify application programs upon installing the application programs. Upon registration as members, the users generate a certificate and send the certificate to the vendor 300 via the MNO 100, by executing a program on the mobile terminal 10 of the users 50.

When the application program having the certificate 75 is downloaded in the mobile terminal 10 (S606), the mobile terminal 10 may verify if the application program is a genuine application provided by the vendor 300 by utilizing the user certificate 75 included in the application program and the secure information of the SIM card 20 (S607). Once verified, the application program becomes executable on the mobile terminal 10.

If the user 50 of the mobile phone 10 becomes a member of different software vendors that subscribe this SIM security service, the SIM card 20 can generate multiple certificates and provide them to respective vendors via the MNO 100. As above, the information to be verified may not be limited to application programs. For example, browsing a web site may be approved (verified) by using this information.

In the foregoing examples, the SIM card 20 generates a key or a certificate and sends it to the SIM OTA server for use by the third parties (e.g., the entity 200 or the vendor 300), or stores a key or a certificate sent from the SIM OTA server 110, which receives the key or the certificate from the third parties (e.g., the entity 200 or the vendor 300). However, the SIM card 20 may generate other information and may store other information than the key or the certificate. Such information is transmitted to and from the SIM card via the SIM OTA server for use by the third party.

In the present disclosure, all or a part of the functions or operations of the unit, device, systems or servers can be implemented as software. In such a case, the software is recorded on one or more non-transitory recording media such as a ROM, an optical disk or a hard disk drive, and when the software is executed by a processor, the software causes the processor together with peripheral devices to execute the functions, for example, the functions as set forth above, specified in the software. A system or apparatus may include such one or more non-transitory recording media on which the software is recorded and a processor together with necessary hardware devices such as an interface.

For example, the SIM card 20 may include a processor and a ROM storing a program that, when executed by the processor, causes the processor to perform the foregoing functions as described by the first to forth examples. The servers 110 and 120 of the MNO 100 may also include a processor and a storage device storing a program that, when executed by the processor, causes the processor to perform the foregoing functions as described by the first to forth examples. The servers 110 and 120 of the MNO 100 may be one server or multiple servers, or the server 110 may perform the functions of the server 120.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
    a first server configured to support secure communication directly between a removable tamper-resistant module included in a mobile terminal and a third party server, wherein:
        the first server is configured to convey information between the removable tamper-resistant module and the third party server, the conveyed information enabling the secure communication directly between the removable tamper-resistant module and the third party server,
        the first server is located in a mobile network operator that provides mobile communication services to the mobile terminal,
        the third party server is logically located outside of the mobile network operator, and
        the first server is configured to be able to communicate with the removable tamper-resistant module via a secure communication link.

2. The system of claim 1, wherein the removable tamper-resistant module is a subscriber identity module (SIM) card or a universal integrated circuit card (UICC).

3. The system of claim 2, wherein the first server of a mobile network operator is a SIM over-the-air (OTA) server.

4. The system of claim 1, further comprising a second server located in the mobile network operator and configured to convey the information between the first server and the third party server, the second server including at least one of a trusted service manager or an identity server, the first and second servers conveying the information therebetween through a secure internal network.

5. The system of claim 4, wherein:
    the mobile network operator includes a firewall behind which the first and second servers are logically located, and
    the third party server is logically located outside the firewall of the mobile network operator.

6. The system of claim 4, wherein:
    the first server is configured to:
        receive the information from the removable tamper-resistant module, the information being generated by the removable tamper-resistant module by utilizing secure information stored in the removable tamper-resistant module; and
        send the information to the second server through the secure internal network of the mobile network operator, and
    the second server is configured to send the information to the third party server.

7. The system of claim 6, wherein:
    the second server is configured to receive information sent from different removable tamper-resistant modules included in different mobile terminals, and the second server is configured to generate a list including the information from the different removable tamper-resistant modules, and send the list to the third party server.

8. The system of claim 1, wherein:
the second server is configured to:
  receive the information from the third party server; and
  send the information to the first server through the secure internal network of the mobile network operator, and
the first server is configured to send the information to the removable tamper-resistant module.

9. The system of claim 1, wherein the information is a public key for the tamper-resistant module.

10. The system of claim 1, wherein the information is a public key for the third party server.

11. The system of claim 1, wherein the information is a certificate of the tamper-resistant module for verifying data or a program to be installed in the mobile terminal from the third party server.

12. The system of claim 1, wherein the information is a certificate of the third party server for verifying data or a program to be installed in the mobile terminal from the third party server.

13. A tamper-resistant module to be installed in a mobile terminal, the tamper-resistant module comprising:
  identification information unique to the tamper-resistant module; and
  a memory, wherein the tamper-resistant module is configured to:
    generate information based on the identification information, the generated information enabling secure communication directly between the removable tamper-resistant module and a third party server logically located outside of a mobile network operator that provides mobile communication services to the mobile terminal;
    store the generated information; and
    send, by utilizing a wireless interface of the mobile terminal in which the tamper-resistant module is removably installed, the generated information to a server of the mobile network operator through a secure communication link between the mobile terminal and the server of the mobile network operator.

14. The tamper-resistant module of claim 13, wherein the tamper-resistant module is a subscriber identity module (SIM) card or a universal integrated circuit card (UICC).

15. The tamper-resistant module of claim 14, wherein the server is a SIM over-the-air (OTA) server.

16. The tamper-resistant module of claim 13, wherein the information is a public key for the tamper-resistant module.

17. The tamper-resistant module of claim 13, wherein the information is a certificate for verifying data or program to be installed in the mobile terminal from the third party server.

18. The tamper-resistant module of claim 13, wherein the tamper-resistant module is further configured to receive third-party information from the server, the third-party information provided by the third party server.

19. The tamper-resistant module of claim 18, wherein the third-party information is a certificate for verifying data or program to be installed in the mobile terminal from the third party server.

20. A method comprising:
  conveying security information between a removable tamper-resistant module in a mobile terminal and a third party server through a mobile network operator server located in a mobile network operator that provides mobile communication services to the mobile terminal, the third party server logically located outside of the mobile network operator and the security information enabling secure communication directly between the removable tamper-resistant module and the third party server; and
  permitting direct communication between the tamper-resistant module and the third party server using the security information only after the security information is provided between the tamper-resistant module and the third party server through the mobile network operator server.

* * * * *